US00RE50932E

(19) United States
(12) Reissued Patent
Kim et al.

(10) Patent Number: US RE50,932 E
(45) Date of Reissued Patent: *Jun. 23, 2026

(54) APPARATUS AND METHOD FOR TRANSMITTING AND RECEIVING SIGNAL IN A MOBILE COMMUNICATION SYSTEM

(71) Applicant: Samsung Electronics Co., Ltd., Suwon-si (KR)

(72) Inventors: Eun-Yong Kim, Hwaseong-si (KR); June Moon, Seoul (KR); Chung-Ryul Chang, Yongin-si (KR); Young-Ky Kim, Seoul (KR); Eun-Seok Ko, Seongnam-si (KR)

(73) Assignee: Samsung Electronics Co., Ltd., Suwon-si (KR)

( * ) Notice: This patent is subject to a terminal disclaimer.

(21) Appl. No.: 18/396,212

(22) Filed: Dec. 26, 2023

Related U.S. Patent Documents

Reissue of:
(64) Patent No.: 10,708,818
Issued: Jul. 7, 2020
Appl. No.: 13/206,886
Filed: Aug. 10, 2011

U.S. Applications:
(63) Continuation of application No. 17/729,396, filed on Apr. 26, 2022, now Pat. No. Re. 49,823, which is an application for the reissue of Pat. No. 10,708,818.

(30) Foreign Application Priority Data

Aug. 11, 2010 (KR) ..... 10-2010-0077578

(51) Int. Cl.
*H04W 28/08* (2023.01)
*H04L 5/00* (2006.01)
*H04W 88/08* (2009.01)

(52) U.S. Cl.
CPC ..... *H04L 5/0048* (2013.01); *H04W 88/085* (2013.01)

(58) Field of Classification Search
CPC ..... H04L 5/0048; H04W 88/085
See application file for complete search history.

(56) References Cited

U.S. PATENT DOCUMENTS 7,054,320 B1 * 5/2006 Lee et al. ..... 370/395.6
8,229,418 B2 * 7/2012 Mori et al. ..... 455/424
(Continued)

FOREIGN PATENT DOCUMENTS

EP 2 393 317 A1 12/2011
KR 10-2006-0010760 A 2/2006
(Continued)

OTHER PUBLICATIONS

Extended European Search Report dated Dec. 21, 2016, issued in a counterpart European Application No. 11816611. 5.
(Continued)

*Primary Examiner* — Ovidio Escalante
(74) *Attorney, Agent, or Firm* — Jefferson IP Law, LLP

(57) ABSTRACT

Apparatuses and methods for transmitting and receiving signals in a mobile communication system are provided. A method for transmitting a signal by an evolved Node B (eNB) in a mobile communication system includes transmitting a same control channel signal to each of a plurality of Radio Units (RUs), and transmitting a different data channel signal to each of the plurality of RUs. A data channel signal transmitted to each of the plurality of RUs may be determined taking into account at least one of a location of a User Equipment (UE) that will receive the data channel signal, and load balancing.

14 Claims, 9 Drawing Sheets

(56) References Cited

U.S. PATENT DOCUMENTS

2001/0014608 A1* 8/2001 Backstrom et al. ..... 455/450
2005/0041694 A1* 2/2005 Liu ..... 370/524
2005/0130662 A1* 6/2005 Murai ..... H04J 11/004 455/444
2007/0008917 A1 1/2007 Calcagno et al.
2007/0060192 A1* 3/2007 Morimoto ..... H04W 48/20 455/525
2007/0167181 A1* 7/2007 Ramesh et al. ..... 455/502
2008/0134194 A1 6/2008 Liu
2008/0146230 A1* 6/2008 Pandian et al. ..... 455/436
2008/0192673 A1* 8/2008 Chindapol et al. ..... 370/315
2008/0318608 A1* 12/2008 Inoue ..... H04B 1/707 455/509
2009/0080366 A1* 3/2009 Shao et al. ..... 370/315
2009/0247228 A1* 10/2009 Yellin ..... H04W 24/02 455/561
2010/0075678 A1* 3/2010 Akman ..... H04W 24/06 455/436
2010/0142466 A1 6/2010 Palanki et al.
2010/0216481 A1* 8/2010 Gormley ..... 455/450
2010/0260156 A1* 10/2010 Lee ..... H04W 56/0035 370/336
2010/0265874 A1 10/2010 Palanki et al.
2010/0290413 A1* 11/2010 Kuwahara ..... H04W 24/02 370/329
2010/0296591 A1* 11/2010 Xu ..... H04B 7/0413 375/259
2011/0103296 A1* 5/2011 Ji ..... H04L 5/0007 370/329
2011/0134850 A1* 6/2011 Kishigami ..... H04L 5/0091 370/328
2011/0170496 A1* 7/2011 Fong ..... H04L 5/0053 370/329
2011/0218011 A1 9/2011 Kim et al.
2011/0235568 A1* 9/2011 Esteves ..... H04B 7/15507 370/315
2011/0317637 A1 12/2011 Kim et al.
2012/0114021 A1* 5/2012 Chung ..... H04L 5/0048 375/211
2013/0090055 A1* 4/2013 Pitakdumrongkija ... H04B 7/15 455/9

FOREIGN PATENT DOCUMENTS

KR 10-2010-0064334 A 6/2010
KR 10-2010-0084102 A 7/2010
WO 2010-087031 A1 8/2010

OTHER PUBLICATIONS

European Examination Report dated Oct. 6, 2023, issued in European Patent Application No. 20217095.7.

* cited by examiner

APPARATUS AND METHOD FOR TRANSMITTING AND RECEIVING SIGNAL IN A MOBILE COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation reissue application of U.S. patent application Ser. No. 17/729,396, which is an application for reissue of U.S. Pat. No. 10,708,818.*

PRIORITY

This application claims the benefit under 35 U.S.C. § 119(a) of a Korean patent application filed in the Korean Intellectual Property Office on Aug. 11, 2010 and assigned Serial No. 10-2010-0077578, the entire disclosure of which is hereby incorporated by reference.

BACKGROUND OF THE INVENTION

1. Field of the Invention

The present invention relates to a mobile communication system. More particularly, the present invention relates to an apparatus and method for transmitting and receiving signals in a mobile communication system.

2. Description of the Related Art

The rapid increase in the number of smart phone subscribers has resulted in a corresponding increase in traffic demand by those subscribers. Despite being in the process of commercialization, an Orthogonal Frequency Division Multiple Access (OFDMA)-based mobile communication system having a relatively high frequency efficiency, such as a 3$^{rd}$ Generation Partnership Project (3GPP) Long-Term Evolution (LTE) mobile communication system, will likely not have sufficient capacity to meet the increasing traffic demand. Therefore, there is a trend toward adopting a micro cell system and a repeater system to increase overall system capacity.

A configuration of a micro cell system will be described below with reference to FIG. 1.

FIG. 1 schematically illustrates a configuration of a micro cell system according to the related art.

Referring to FIG. 1, the micro cell system includes a plurality of, for example, 4 micro cells 111-1, 113-1, 115-1, and 117-1. The micro cell 111-1 is a service coverage area where a micro evolved Node B (eNB) 111-2 provides services. The micro cell 113-1 is a service coverage area where a micro eNB 113-2 provides services. The micro cell 115-1 is a service coverage area where a micro eNB 115-2 provides services. The micro cell 117-1 is a service coverage area where a micro eNB 117-2 provides services. It will be assumed that the four micro cells 111-1, 113-1, 115-1, and 117-1 have the same coverage area as the service coverage area where one macro eNB (not shown) provides services.

As described above, in the micro cell system, eNBs are installed more densely to increase the system capacity, thereby causing a decrease in the spatial coverage or size of the split cells. The decrease in the size of the split cells may contribute to increasing the average capacity that users can experience, but in inter-cell boundaries, may decrease the data capacity due to interference between data channels and increase outage probability due to interference between control channels. In addition, the smaller the cell size becomes, the more frequently User Equipments (UEs) may perform handover caused by their movements, thereby increasing overhead and making the communication environment unstable.

A configuration of a repeater system will be described below with reference to FIG. 2.

FIG. 2 schematically illustrates a configuration of a repeater system according to the related art.

Referring to FIG. 2, the repeater system includes a plurality of, for example, 4 Radio Units (RUs) 211, 213, 215, and 217 within one cell. The four RUs 211, 213, 215, and 217 transmit and receive the same signals. Therefore, in the boundaries among the RUs 211, 213, 215, and 217, signals undergo macro combining, contributing to an improvement in the capacity of UEs located in the boundary areas among the RUs 211, 213, 215, and 217, and a reduction in the outage probability. In addition, when moving between the RUs 211, 213, 215, and 217, UEs are not required to perform handover.

The repeater system is mainly used for service coverage area expansion and coverage hole filling, because it expands strong-electric field areas using multiple RUs, which are spatially separated. However, unlike the micro cell system, the repeater system may suffer from a reduction in the resource efficiency and system capacity because multiple RUs transmit and receive the same signals.

In summary, the micro cell system and repeater system may be adopted to increase overall system capacity may have the following shortcomings.

First, in the case of the micro cell system, capacities of UEs located in the inter-cell boundaries are limited, and its outage probability is relatively high. UEs may perform handover more frequently, increasing the overhead and making the communication environment unstable.

Second, the repeater system may improve capacities of UEs located in the inter-cell boundaries because multiple RUs transmit and receive the same signals, but may suffer from a reduction in the overall system capacity due to its low resource efficiency.

SUMMARY OF THE INVENTION

Aspects of the present invention are to address the above-mentioned problems and/or disadvantages and to provide at least the advantages described below. Accordingly, an aspect of the present invention is to provide an apparatus and method for transmitting and receiving signals in a mobile communication system.

In accordance with an aspect of the present invention, a method for transmitting a signal by an evolved Node B (eNB) in a mobile communication system is provided. The method includes transmitting a same control channel signal to each of a plurality of Radio Units (RUs), and transmitting a different data channel signal to each of the plurality of RUs. A data channel signal transmitted to each of the plurality of RUs may be determined taking into account at least one of a location of a User Equipment (UE) that will receive the data channel signal, and load balancing.

In accordance with another aspect of the present invention, an eNB in a mobile communication system is provided. The eNB includes a digital unit for transmitting a same control channel signal to each of a plurality of RUs, and for transmitting a different data channel signal to each of the plurality of RUs. A data channel signal transmitted to each of the plurality of RUs may be determined taking into account at least one of a location of a UE that will receive the data channel signal, and load balancing.

In accordance with another aspect of the present invention, a method for transmitting and receiving a signal by an RU in a mobile communication system is provided. The method includes receiving a control channel signal and a data channel signal from an eNB. The control channel signal may be equal to control channel signals that the eNB transmits to a plurality of RUs except for the RU. The data channel signal may be different from data channel signals that the eNB transmits to the plurality of RUs except for the RU. A data channel signal transmitted to each of the RU and the plurality of RUs may be determined taking into account at least one of a location of a UE that will receive the data channel signal, and load balancing.

In accordance with another aspect of the present invention, an RU in a mobile communication system is provided. The RU includes a receiver for receiving a control channel signal and a data channel signal from an eNB. The control channel signal may be equal to control channel signals that the eNB transmits to a plurality of RUs except for the RU. The data channel signal may be different from data channel signals that the eNB transmits to the plurality of RUs except for the RU. A data channel signal transmitted to each of the RU and the plurality of RUs may be determined taking into account at least one of a location of a UE that will receive the data channel signal, and load balancing.

In accordance with another aspect of the present invention, a method for receiving a signal by a UE in a mobile communication system is provided. The method includes receiving a control channel signal and a data channel signal from each of a plurality of RUs. A control channel signal received from each of the plurality of RUs may be equal. A data channel signal received from each of the plurality of RUs may be different. A data channel signal received from each of the plurality of RUs may be determined taking into account at least one of a location of the UE, and load balancing.

In accordance with another aspect of the present invention, a UE in a mobile communication system is provided. The UE includes a receiver for receiving a control channel signal and a data channel signal from each of a plurality of RUs. A control channel signal received from each of the plurality of RUs may be equal. A data channel signal received from each of the plurality of RUs may be different. A data channel signal received from each of the plurality of RUs may be determined taking into account at least one of a location of the UE, and load balancing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for transmitting and receiving signals in a mobile communication system. In addition, exemplary embodiments of the present invention provide an apparatus and method for allowing multiple Radio Units (RUs) to transmit/receive control channel signals in a shared way, and to transmit/receive data channel signals independently in a mobile communication system. It will be assumed herein that the mobile communication system is a 3rd Generation Partnership Project (3GPP) Long-Term Evolution (LTE) mobile communication system. However, it will be understood by those of ordinary skill in the art that the signal transmission/reception apparatus and method proposed by the exemplary embodiments of the present invention may be used not only in the 3GPP LTE mobile communication system, but also in any other mobile communication system, such as an Institute of Electrical and Electronics Engineers (IEEE) 802.16m communication system.

Figure 1:
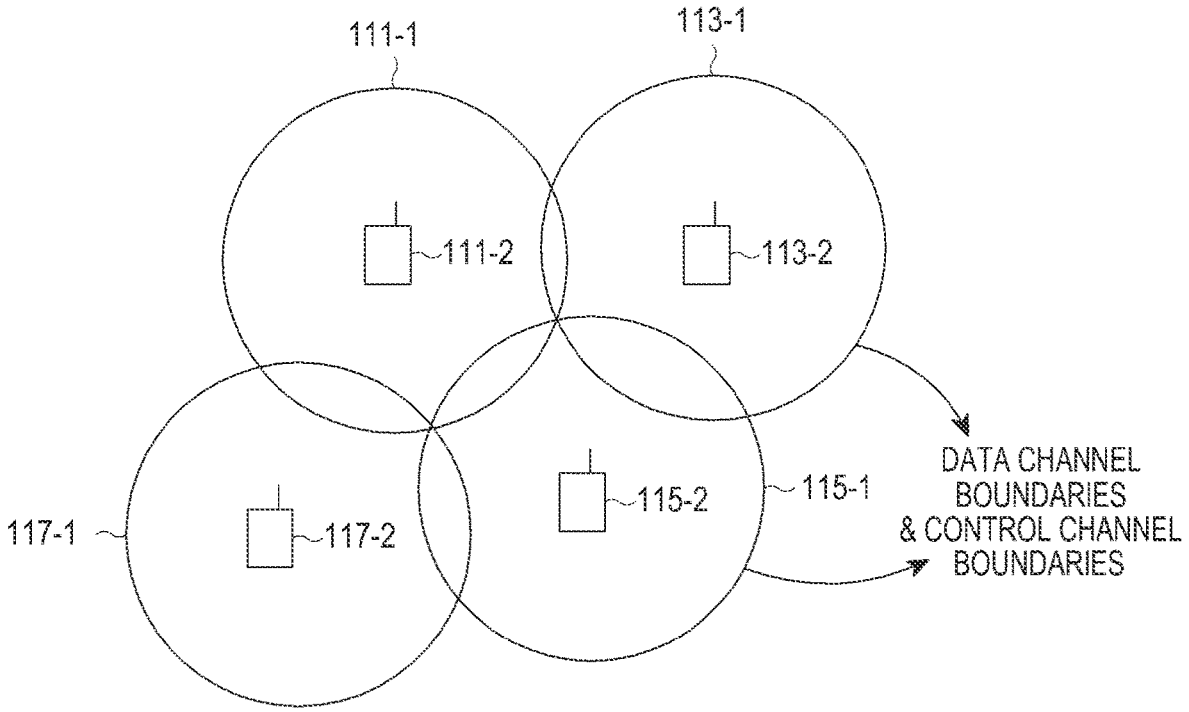
FIG.1 (RELATED ART)
FIG. 1 is a diagram schematically illustrating a configuration of a micro cell system according to the related art.
Figure 2:
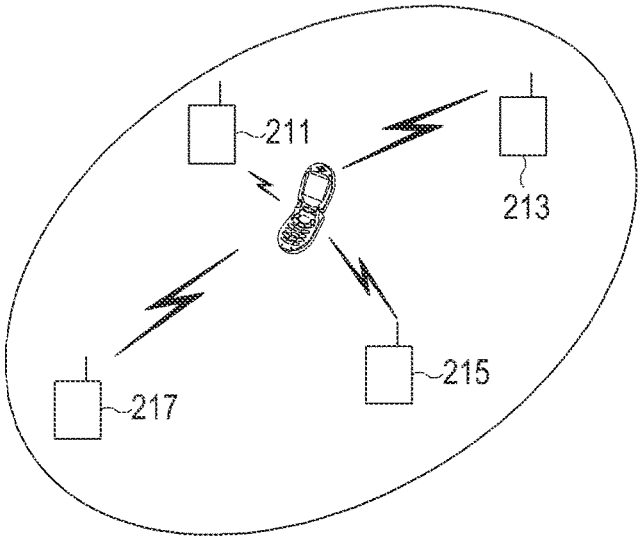
FIG.2 (RELATED ART)
FIG. 2 is a diagram schematically illustrating a configuration of a repeater system according to the related art.
Figure 3:
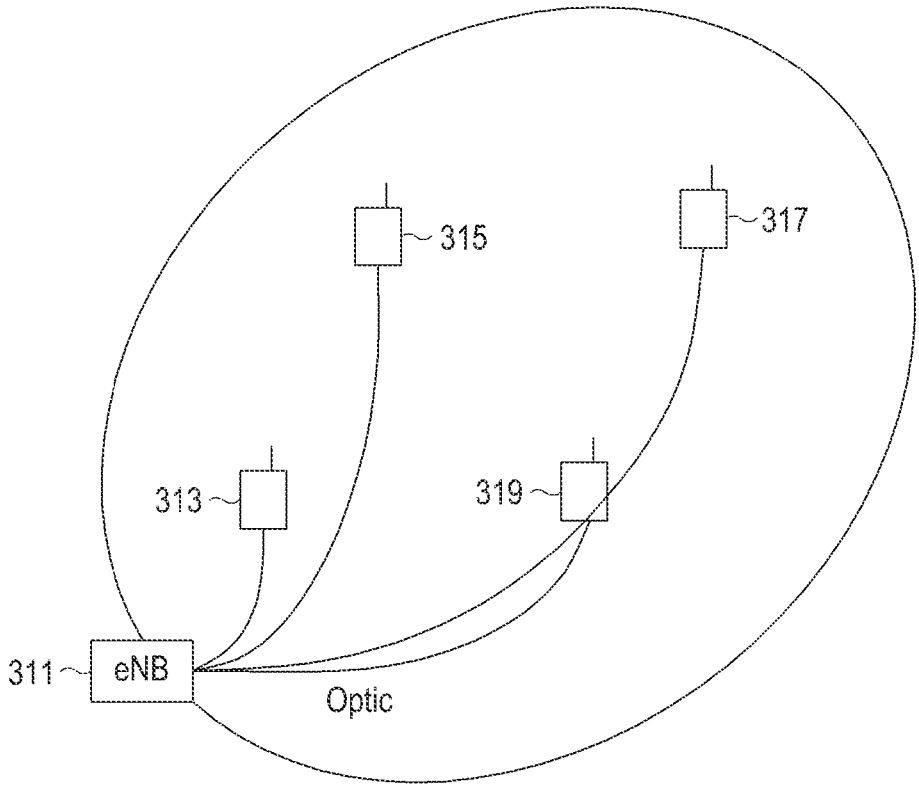
FIG. 3 is a diagram schematically illustrating a configuration of a 3$^{rd}$ Generation Partnership Project (3GPP) Long-Term Evolution (LTE) mobile communication system according to an exemplary embodiment of the present invention.

FIG. 3 schematically illustrates a configuration of a 3GPP LTE mobile communication system according to an exemplary embodiment of the present invention.

Referring to FIG. 3, the 3GPP LTE mobile communication system includes an evolved Node B (eNB) 311, at least one, for example, 4 RUs 313, 315, 317, and 319, and at least one User Equipment (UE, not shown). The eNB 311 manages control channels and data channels in different ways, thereby increasing overall system capacity and making it possible to reduce the overhead caused by frequent handover of UEs.

A method of managing control channels and data channels by the eNB 311 in FIG. 3 will be described below with reference to FIG. 4.

Figure 4:
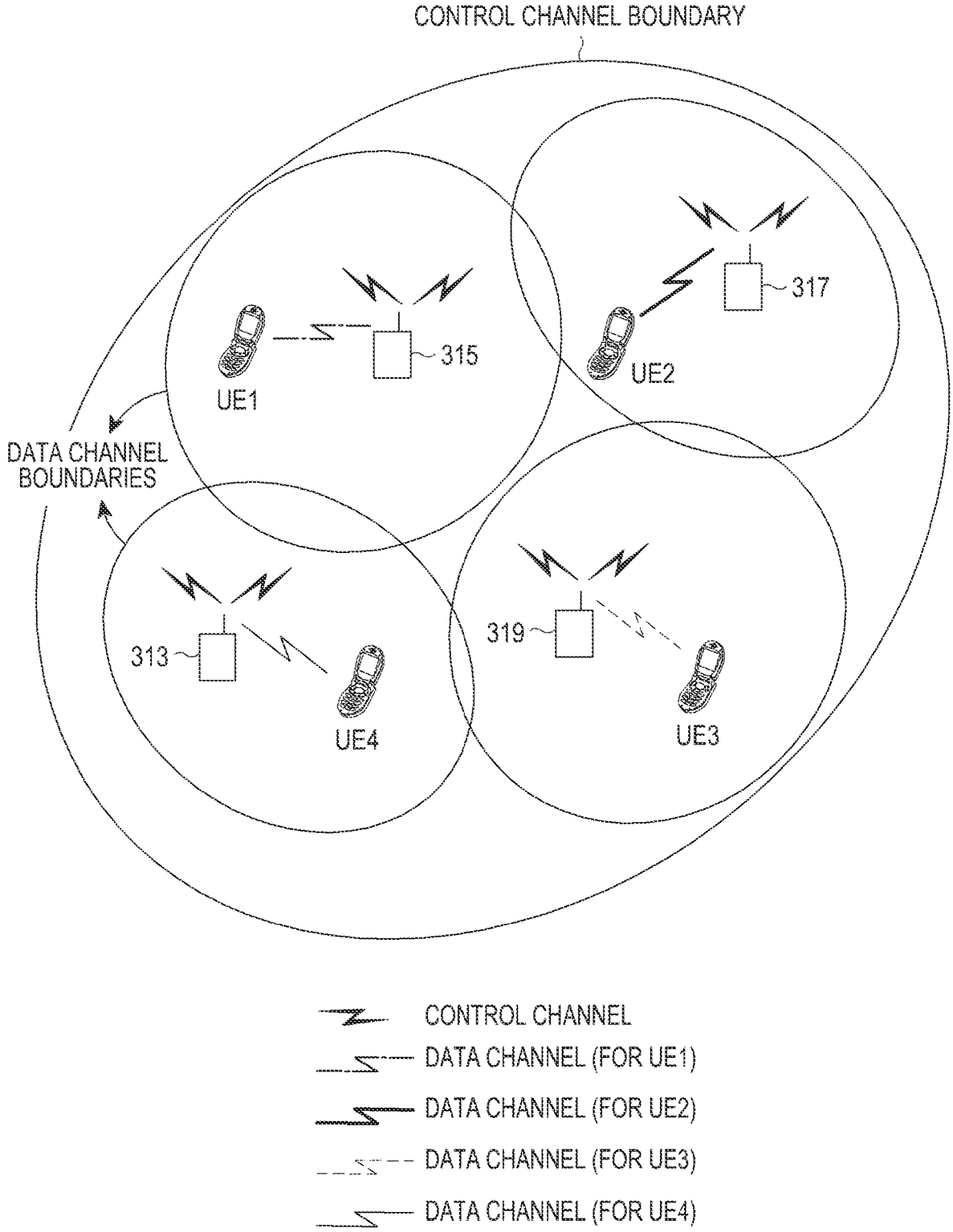
FIG. 4 is a diagram schematically illustrating a method of managing control channels and data channels by the evolved Node B (eNB) 311 in FIG. 3 according to an exemplary embodiment of the present invention.

FIG. 4 schematically illustrates a method of managing control channels and data channels by the eNB 311 in FIG. 3 according to an exemplary embodiment of the present invention.

Referring to FIG. 4, the eNB 311 controls the RUs 313, 315, 317, and 319. The RUs 313, 315, 317, and 319 transmit the same control channel signals in a shared way under control of the eNB 311, but transmit data channel signals individually under control of the eNB 311.

A method of controlling transmission of control channel signals and data channel signals of the RUs 313, 315, 317, and 319 by the eNB 311 will be described in detail below.

First, a method of controlling transmission of control channel signals of the RUs 313, 315, 317, and 319 by the eNB 311 will be described below.

The eNB 311 controls the RUs 313, 315, 317, and 319 to transmit the same control channel signals so that a specific UE may acquire a macro combining gain when receiving the control channel signals. When the RUs 313, 315, 317, and 319 transmit the same control channel signals in this way, interference between control channels may not occur, so the specific UE may acquire a macro combining gain.

Second, a method of controlling transmission of data channel signals of the RUs 313, 315, 317, and 319 by the eNB 311 will be described below.

The eNB 311 enables the RUs 313, 315, 317, and 319 to transmit data channel signals independently. In other words, the eNB 311 controls each of the RUs 313, 315, 317, and 319 to transmit data channel signals only to the UE that the RU itself has selected, thereby making it possible to multiplex data channel signals targeting different UEs during their transmission using the same frequency resources. The eNB 311 may determine the UE to which each of the RUs 313, 315, 317, and 319 will transmit data channel signals, taking into account at least one of various parameters, such as locations of UEs, and load balancing. For example, the eNB 311 may control each of the RUs 313, 315, 317, and 319 to transmit data channel signals to the UE located in the shortest distance.

Because the RUs 313, 315, 317, and 319 may multiplex data channel signals targeting different UEs during their transmission using the same frequency resources, interference may occur between data channels in the boundaries among the RUs 313, 315, 317, and 319. Therefore, an exemplary embodiment of the present invention minimizes interference between data channels in the boundaries among the RUs 313, 315, 317, and 319 using an interference control method, thereby increasing capacities of UEs located in the boundaries among the RUs 313, 315, 317, and 319.

As described above, because the RUs 313, 315, 317, and 319 can multiplex data channel signals targeting different UEs during their transmission using the same frequency resources, their resource efficiency and system capacity are higher than those of the repeater system of the related art.

An internal structure of the eNB 311 in FIG. 3 will be described below with reference to FIG. 5.

Figure 5:
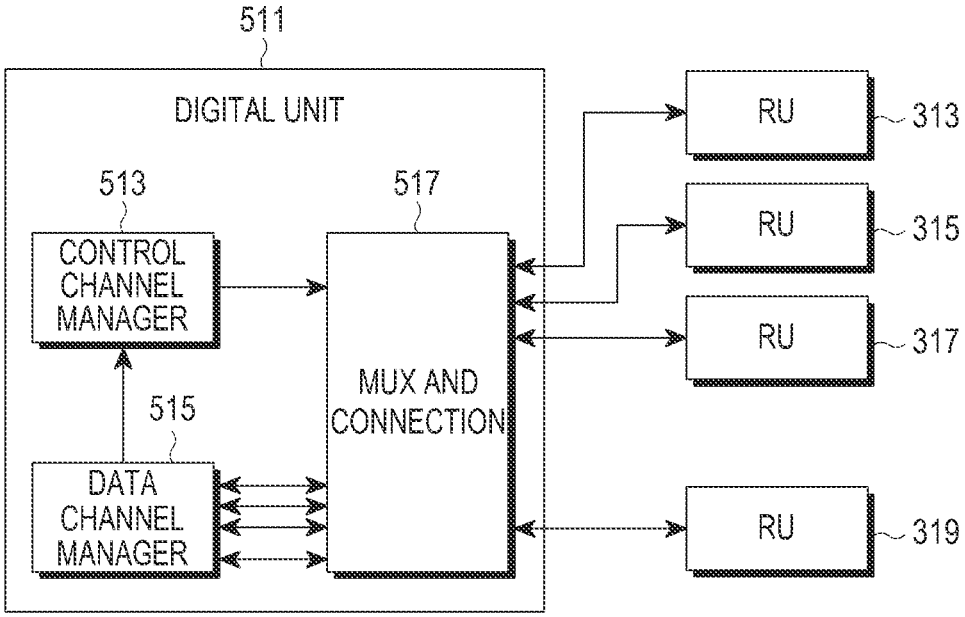
FIG. 5 is a diagram illustrating an internal structure of the eNB 311 in FIG. 3 according to an exemplary embodiment of the present invention.

FIG. 5 illustrates an internal structure of the eNB 311 in FIG. 3 according to an exemplary embodiment of the present invention.

Referring to FIG. 5, the eNB 311 includes a Digital Unit (DU) 511, which includes a control channel manager 513, a data channel manager 515, and a MUltipleXing (MUX) and connection unit 517.

The control channel manager 513 generates DownLink (DL) control channel signals. The control channel manager 513 receives scheduling information from the data channel manager 515 and generates DL control channel signals based on the scheduling information.

The data channel manager 515 performs a scheduling operation, generates scheduling information corresponding to the results of the scheduling operation, and transmits the scheduling information to the control channel manager 513. The data channel manager 515 generates DL data channel signals based on the scheduling information.

The MUX and connection unit 517 multiplexes the DL control channel signals generated by the control channel manager 513 and the DL data channel signals generated by the data channel manager 515, and transmits them to the RUs 313, 315, 317, and 319. Although the RUs 313, 315, 317, and 319 are connected to the MUX and connection unit 517 in the case of FIG. 5 since the configuration of the 3GPP LTE mobile communication system described in FIG. 3 is considered, it will be understood by those of ordinary skill in the art that the MUX and connection unit 517 may be connected to all RUs in the coverage area serviced by the eNB 311.

The MUX and connection unit 517 transmits UpLink (UL) data channel signals received from the RUs 313, 315, 317, and 319 to the data channel manager 515.

The RUs 313, 315, 317, and 319 perform Radio Frequency (RF) processing on the DL control channel signals and DL data channel signals transmitted by the MUX and connection unit 517, and transmit them to their associated UEs. The RUs 313, 315, 317, and 319 are connected to the eNB 311 through, for example, an optic fiber, and exchange signals with the eNB 311 using, for example, a Common Public Radio Interface (CPRI).

Preferably, the RUs 313, 315, 317, and 319 may be installed to contribute to forming strong electric fields in spatially different areas. In other words, the RUs 313, 315, 317, and 319 may be installed to be spatially separated as illustrated in FIG. 3, if they have, for example, omnidirectional antennas. On the other hand, if the RUs 313, 315, 317, and 319 have directional antennas, they may be installed in the same location. In the latter case, strong-electric field areas may be expanded by setting different bore-sights for the directional antennas.

An internal structure of the control channel manager 513 in FIG. 5 will be described below with reference to FIG. 6.

Figure 6:
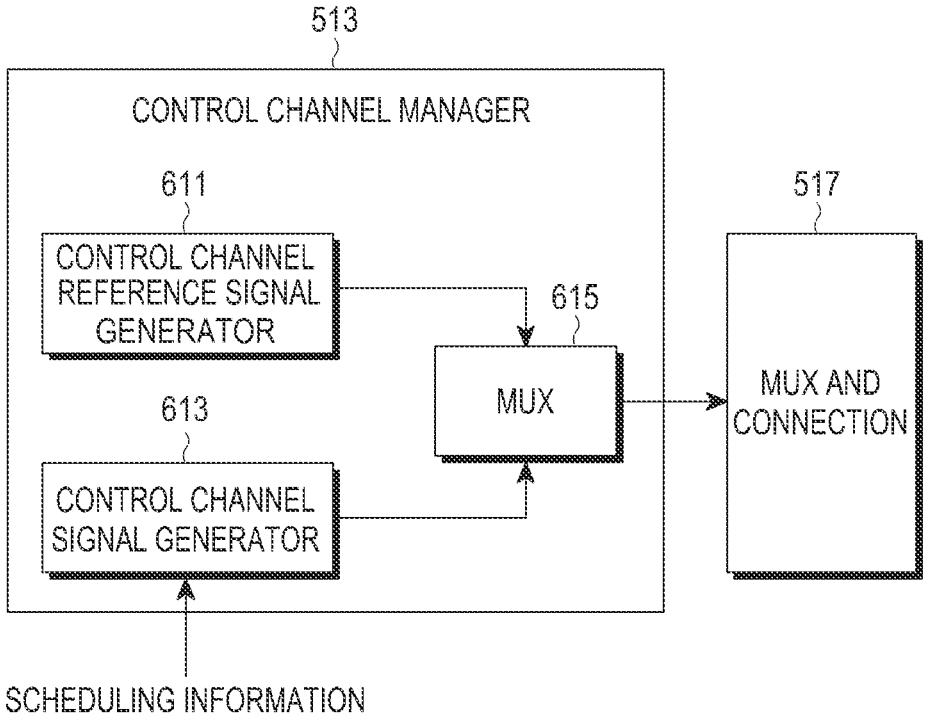
FIG. 6 is a diagram illustrating an internal structure of the control channel manager 513 in FIG. 5 according to an exemplary embodiment of the present invention.

FIG. 6 illustrates an internal structure of the control channel manager 513 in FIG. 5 according to an exemplary embodiment of the present invention.

Referring to FIG. 6, the control channel manager 513 includes a control channel reference signal generator 611, a control channel signal generator 613, and a MUX 615.

The control channel signal generator 613 generates control channel signals based on the scheduling information received from the data channel manager 515. The control channels may include, for example, a Physical Broadcast Channel (PBCH), a Physical Downlink Control Channel (PDCCH), a Physical Control Format Indicator Channel (PCFICH), etc.

The control channel reference signal generator 611 generates control channel reference signals used to demodulate control channel signals for UEs. The control channel reference signals may include, for example, cell-specific reference signals.

The MUX 615 multiplexes the control channel reference signals generated by the control channel reference signal generator 611 and the control channel signals generated by the control channel signal generator 613, and outputs them to the MUX and connection unit 517.

An internal structure of the data channel manager 515 in FIG. 5 will be described below with reference to FIG. 7.

Figure 7:
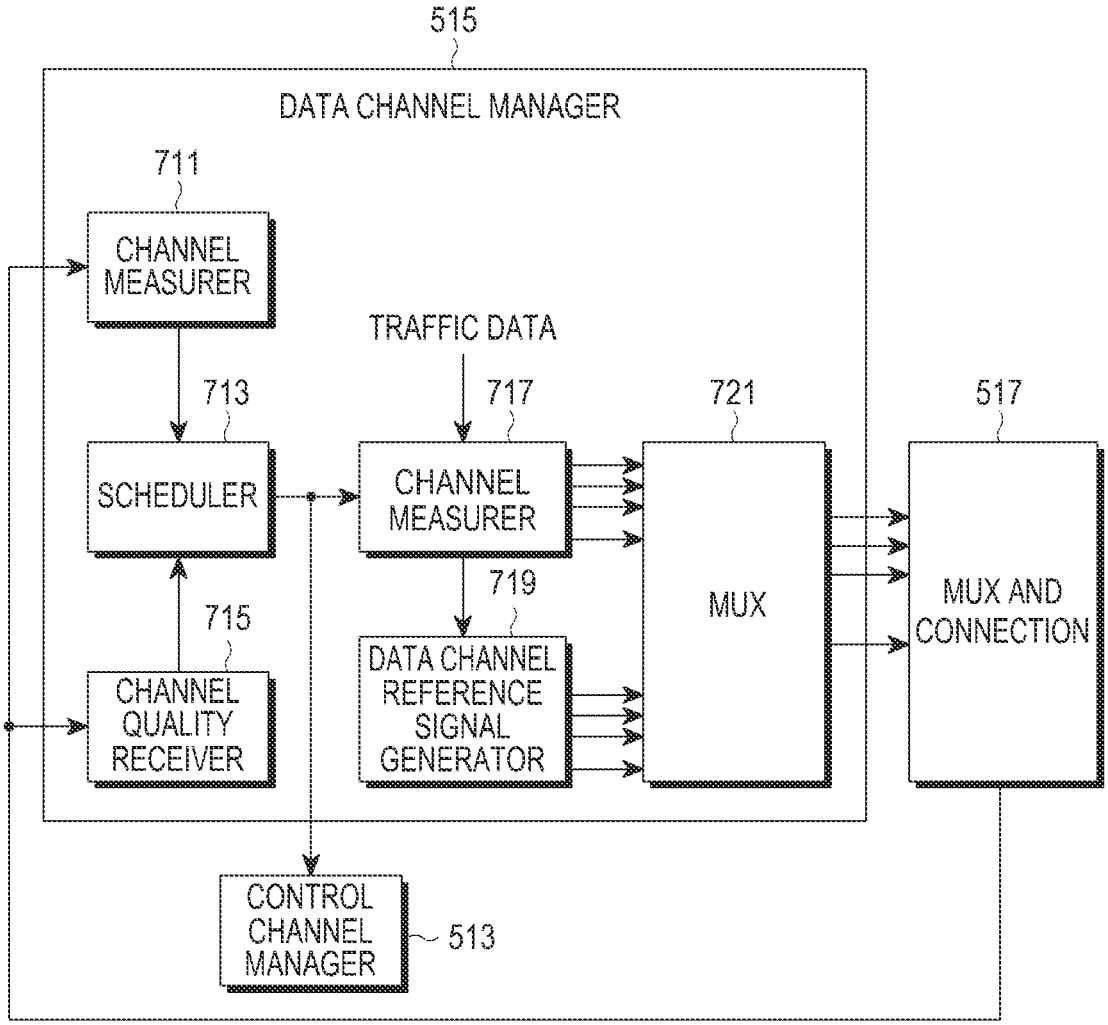
FIG. 7 is a diagram illustrating an internal structure of the data channel manager 515 in FIG. 5 according to an exemplary embodiment of the present invention.

FIG. 7 illustrates an internal structure of the data channel manager 515 in FIG. 5 according to an exemplary embodiment of the present invention.

Referring to FIG. 7, the data channel manager 515 includes a channel measurer 711, a scheduler 713, a channel quality receiver 715, a data channel generator 717, a data channel reference signal generator 719, and a MUX 721.

The data channel manager 515 enables multiple RUs to transmit data channel signals to different UEs independently. In other words, the data channel manager 515 enables the eNB 311 to transmit different data channel signals to multiple UEs by reusing the same frequency resources. The data channel manager 515 determines UEs which are spatially separated if possible, as UEs that transmit data channel signals by reusing the same frequency resources, thereby minimizing interference between data channels.

Because the data channel signals, unlike the control channel signals, are not equally transmitted by all RUs, if a UE receives the data channel signals based on only the channel estimates for the reference signals transmitted equally by all RUs, for example, for the control channel reference signals, its receive success rate may be poor. Therefore, it is preferable that each of the RUs transmits a data channel reference signal to a UE individually, to which the RU itself will transmit data channel signals so that the UE may receive the data channel signals based on a channel estimate for the data channel reference signal, or may estimate a channel for the data channel signals based on both the control channel reference signal and beamforming weight information. For convenience, it will be assumed herein that RUs transmit data channel reference signals independently, and UEs receive data channel signals based on the data channel reference signals. The data channel reference signals may include, for example, dedicated reference signals. The 3GPP LTE mobile communication system may transmit the dedicated reference signals in accordance with Transmission Mode 7 when using the Release 8 standard, and may transmit the dedicated reference signals in accordance with Transmission Mode 7 or Transmission Mode 8 when using the Release 9 standard.

The channel quality receiver 715 receives channel quality information that each UE has measured and transmitted through the MUX and connection unit 517, and transmits the received channel quality information to the scheduler 713.

An internal structure of the channel measurer 711 in FIG. 7 will be described below with reference to FIG. 8.

Figure 8:
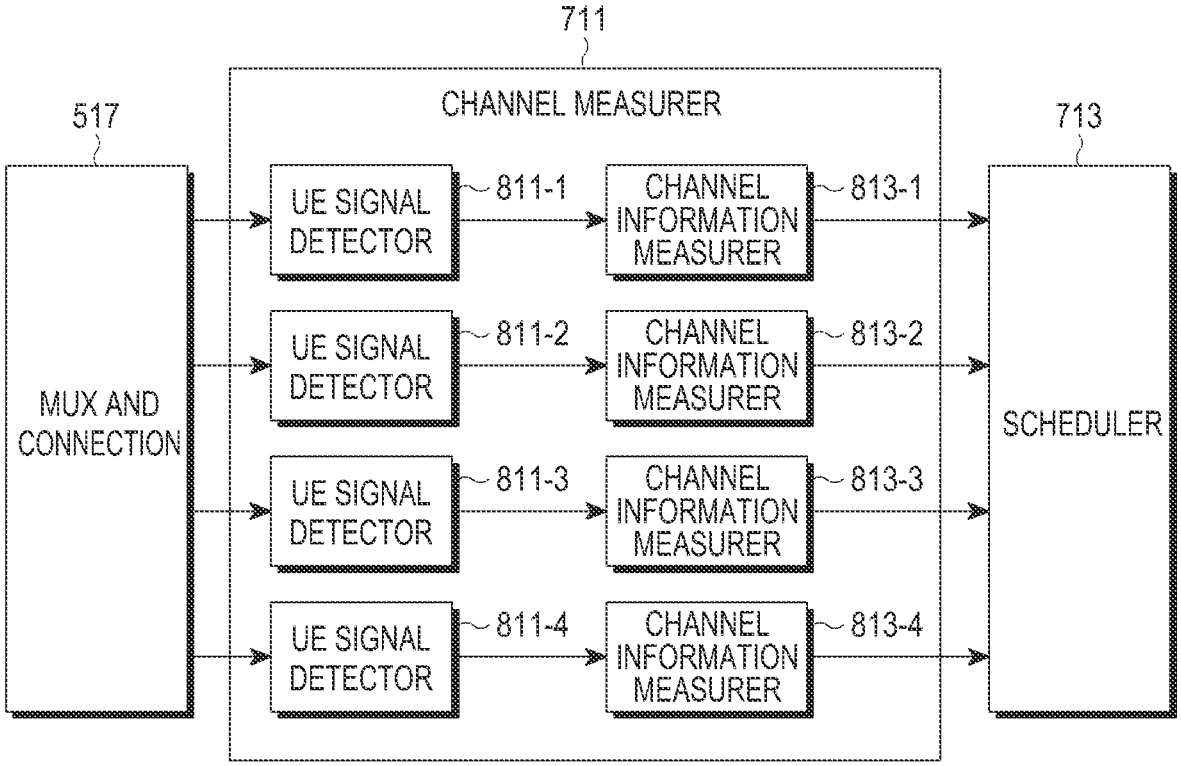
FIG. 8 is a diagram illustrating an internal structure of the channel measurer 711 in FIG. 7 according to an exemplary embodiment of the present invention.

FIG. 8 illustrates an internal structure of the channel measurer 711 in FIG. 7 according to an exemplary embodiment of the present invention.

Referring to FIG. 8, the channel measurer 711 includes a plurality of, for example, 4 UE signal detectors 811-1, 811-2, 811-3, and 811-4, and a plurality of, for example, 4 channel information measurers 813-1, 813-2, 813-3, and 813-4.

Signals received from RUs through the MUX and connection unit 517, i.e., signals transmitted by UEs, are delivered to their associated UE signal detectors. For example, a signal received from the RU 313 is delivered to the UE signal detector 811-1. A signal received from the RU 315 is delivered to the UE signal detector 811-2. A signal received from the RU 317 is delivered to the UE signal detector 811-3. A signal received from the RU 319 is delivered to the UE signal detector 811-4.

The UE signal detectors 811-1, 811-2, 811-3, and 811-4 detect their associated UE signals from the signals received from the MUX and connection unit 517, and output the detected UE signals to their associated channel information measurers 813-1, 813-2, 813-3, and 813-4 connected thereto. In other words, the UE signal detector 811-1 outputs its detected UE signal to the channel information measurer 813-1. The UE signal detector 811-2 outputs its detected UE signal to the channel information measurer 813-2. The UE signal detector 811-3 outputs its detected UE signal to the channel information measurer 813-3. The UE signal detector 811-4 outputs its detected UE signal to the channel information measurer 813-4.

The channel information measurers 813-1, 813-2, 813-3, and 813-4 measure information about channels between associated UEs and RUs based on the UE signals detected by the UE signal detectors 811-1, 811-2, 811-3, and 811-4, respectively, and output the measured channel information to the scheduler 713. The channel information may include channel powers and channel coefficients between associated UEs and RUs.

An operation of the channel measurer 711 will be described in additional detail below.

Signals received from RUs through the MUX and connection unit 517 are output to their associated UE signal detectors. The UE signal detectors, which receive Sounding Reference Signals (SRSs) that UEs have transmitted in a UL, may detect their associated UE signals based on the SRSs transmitted by the UEs, and output the detected UE signals to their associated channel information measurers. The channel information measurers measure channel information based on the UE signals detected by the UE signal detectors.

An operation of the scheduler 713 in FIG. 7 will be described below with reference to FIG. 9.

Figure 9:
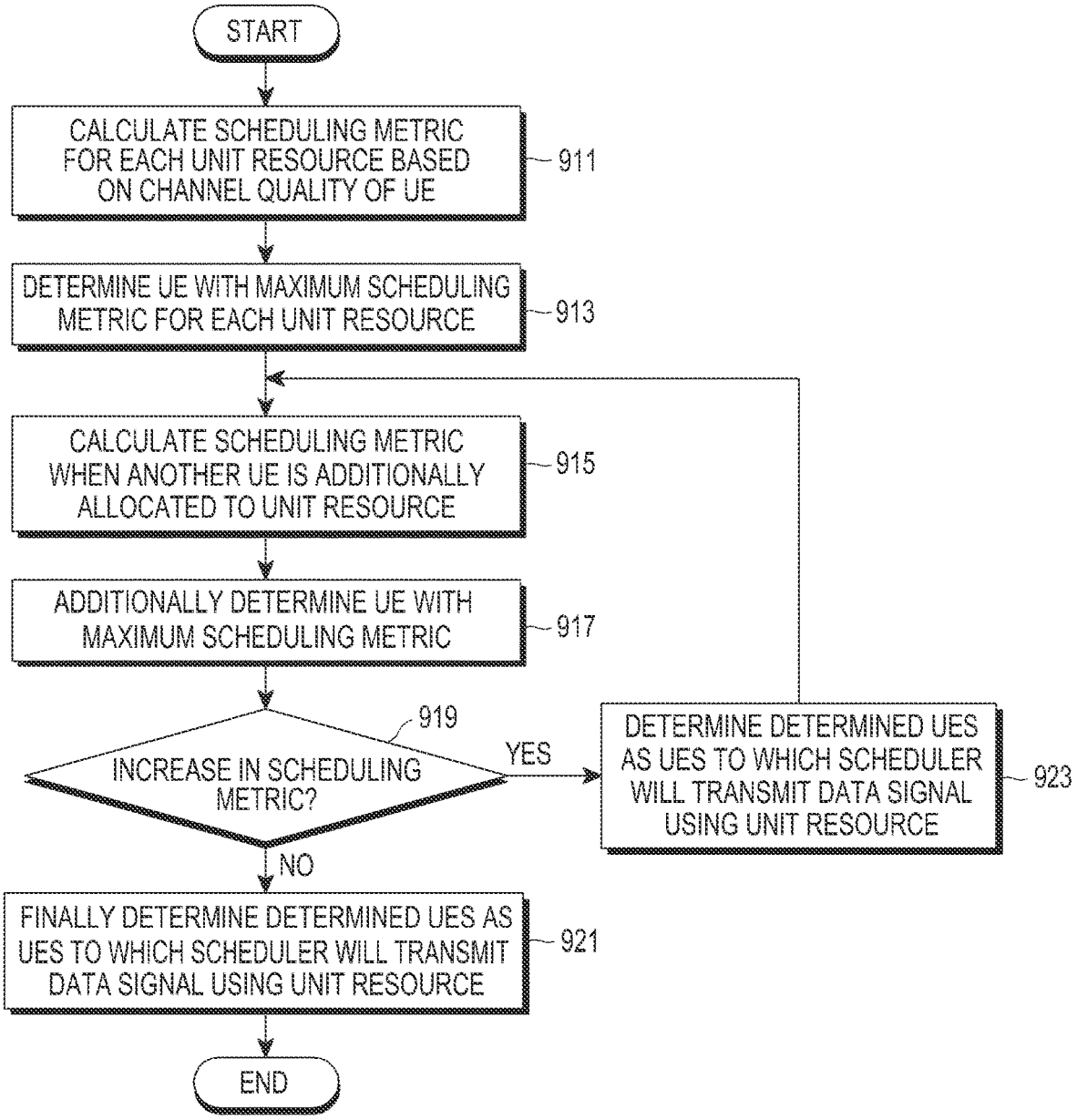
FIG. 9 is a flowchart illustrating an operation of the scheduler 713 in FIG. 7 according to an exemplary embodiment of the present invention.

FIG. 9 illustrates an operation of the scheduler 713 in FIG. 7 according to an exemplary embodiment of the present invention.

Referring to FIG. 9, in step 911, the scheduler 713 calculates a scheduling metric for each unit resource based on channel qualities of UEs. The unit resource may include, for example, a sub band. In step 913, the scheduler 713 determines a UE having the maximum scheduling metric, for each unit resource.

In step 915, the scheduler 713 calculates a scheduling metric when in addition to the UE having the maximum scheduling metric, another UE determined based on the channel quality information is additionally assigned to a unit resource, using channel information between UEs and RUs. In step 917, the scheduler 713 additionally determines a UE having the maximum scheduling metric, for each unit resource.

In step 919, the scheduler 713 determines if the scheduling metric increases due to the additional determination of a UE. If the scheduling metric does not increase, the scheduler 713 finally determines the determined UEs as UEs to which it will transmit data signals using the unit resource in step 921, thereby completing the scheduling operation.

However, if it is determined in step 919 that the scheduling metric increases, the scheduler 713 determines the determined UEs as UEs to which it will transmit data signals using the unit resource in step 923, and then returns to step 915.

Referring to FIG. 9, the scheduler 713 determines a UE having the maximum scheduling metric when transmitting data channel signals using a relevant unit resource based on the channel qualities of UEs, and determines if the scheduling metric increases when transmitting data channel signals to another UE in addition to the determined UE using a related unit resource based on the channel information between UEs and RUs. If it is determined that the scheduling metric increases, the scheduler 713 determines the determined UEs as UEs to which it will transmit data channel signals using the unit resource, and determines again whether to additionally assign a UE to which it will transmit data channel signals using the unit resource. On the other hand, if the scheduling metric does not increase, the scheduler 713 finally determines the determined UEs as UEs to which it will transmit data channel signals using the unit resource, completing the scheduling operation.

After completing the scheduling operation, the scheduler 713 outputs the scheduling information corresponding to the finally determined UEs to the data channel generator 717 and the control channel manager 513. The scheduler 713 may determine only one UE or multiple UEs at the same time, for each unit resource. The scheduler 713 may allow one RU to transmit data channel signals to UEs, or allow multiple RUs to transmit data channel signals to UEs together. The scheduler 713 outputs the channel information to the data channel generator 717 so that the data channel generator 717 may determine a beamforming weight it will apply to data channels if necessary.

An internal structure of the data channel generator 717 in FIG. 7 will be described below with reference to FIG. 10.

Figure 10:
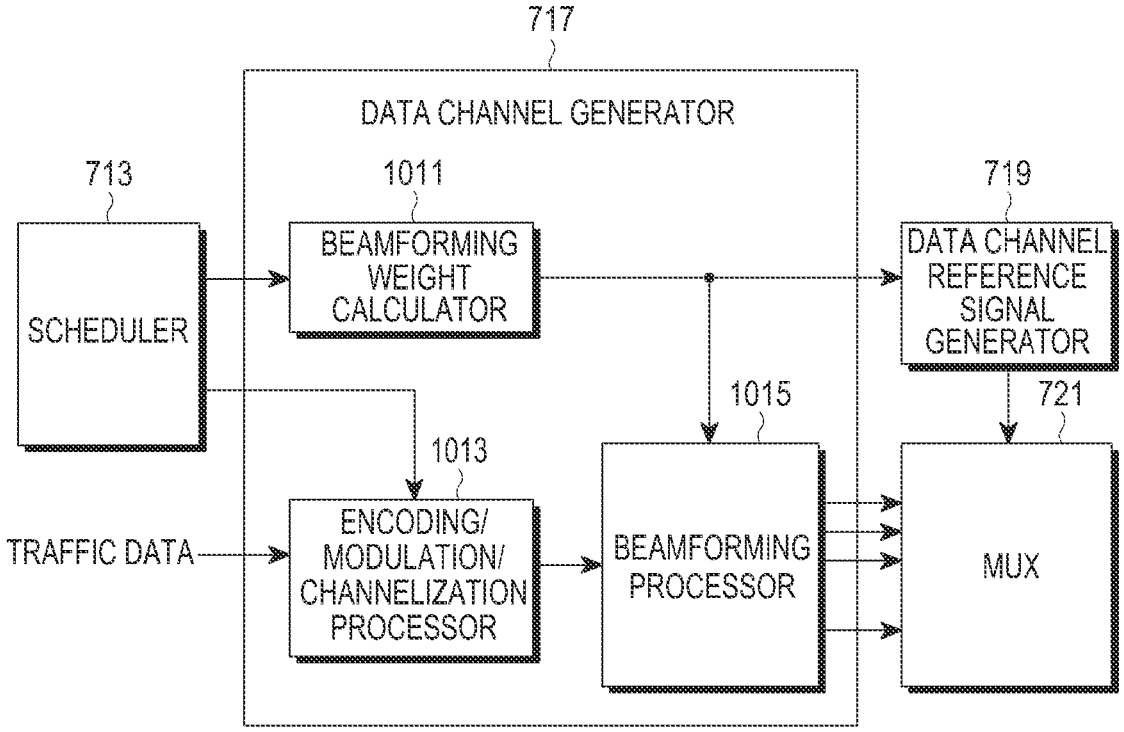
FIG. 10 is a diagram illustrating an internal structure of the data channel generator 717 in FIG. 7 according to an exemplary embodiment of the present invention.

FIG. 10 illustrates an internal structure of the data channel generator 717 in FIG. 7 according to an exemplary embodiment of the present invention.

Referring to FIG. 10, the data channel generator 717 includes a beamforming weight calculator 1011, an encoding/modulation/channelization processor 1013, and a beamforming processor 1015.

The data channel generator 717 receives scheduling information from the scheduler 713, and receives traffic data targeting a UE, which is assigned to a related unit resource based on the scheduling information, i.e., to which it will transmit data channel signals using the unit resource.

The beamforming weight calculator 1011 generates a beamforming weight to be used for a data channel based on the scheduling information, and outputs the beamforming weight to the beamforming processor 1015 and the data channel reference signal generator 719.

The encoding/modulation/channelization processor 1013 performs encoding/modulation/channelization on the input traffic data, and outputs the results to the beamforming processor 1015.

The beamforming processor 1015 performs beamforming processing on the signals output from the encoding/modulation/channelization processor 1013, and outputs transmission signals for RUs to the MUX 721.

The data channel reference signal generator 719 generates reference signals for data channels, i.e., data channel reference signals. The data channel reference signal generator 719 performs the same beamforming processing even on the data channel reference signals, using the beamforming weights output from the beamforming weight calculator 1011, and outputs them to the MUX and connection unit 517. Instead of generating data channel reference signals as described above, it is also possible to allow a UE to estimate a channel of data channel signals based on the control channel reference signals and beamforming weight information. In this case, the data channel reference signal generator 719 is allowed not to generate data channel reference signals.

The MUX 721 multiplexes the signals output from the data channel generator 717 and the data channel reference signal generator 719, and outputs the results to the MUX and connection unit 517.

An internal structure of the MUX and connection unit 517 in FIG. 5 will be described below with reference to FIG. 11.

Figure 11:
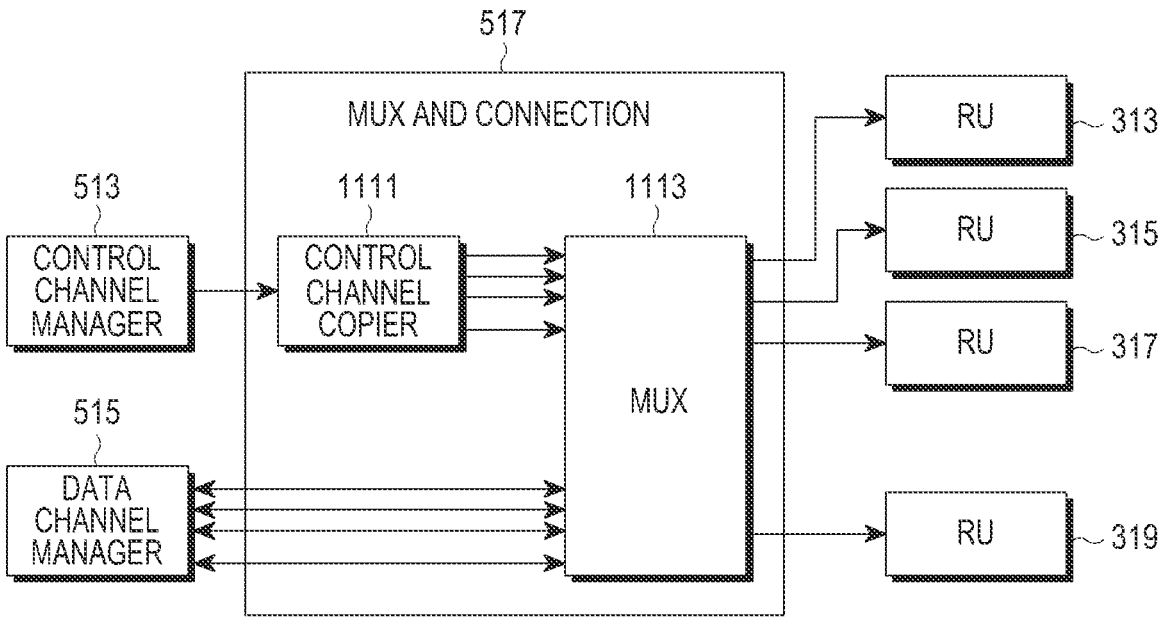
FIG. 11 is a diagram illustrating an internal structure of the MUltipleXing (MUX) and connection unit 517 in FIG. 5 according to an exemplary embodiment of the present invention.

FIG. 11 illustrates an internal structure of the MUX and connection unit 517 in FIG. 5 according to an exemplary embodiment.

Referring to FIG. 11, the MUX and connection unit 517 includes a control channel copier 1111 and a MUX 1113.

The control channel copier 1111 generates control channel signals for RUs by copying a control channel signal so that all RUs may transmit the same control channel signals, and then outputs them to the MUX 1113 for RUs individually.

The MUX 1113 receives the signals output from the control channel copier 1111 and the data channel signals generated for RUs by the data channel manager 515, multiplexes them for RUs individually, and transmits the results to the associated RUs. The MUX 1113 outputs the signals that RUs have received from UEs, to the data channel manager 515.

Although not illustrated in separate drawings, each of RUs may include a transmitter for transmitting various signals, a receiver for receiving various signals, and a controller for controlling operations of the transmitter and the receiver. The transmitter, the receiver and the controller may be realized as separate units, or integrated in a single unit.

Likewise, a UE may include a transmitter for transmitting various signals, a receiver for receiving various signals, a controller for controlling operations of the transmitter and the receiver, and an estimator for estimating various signals. The transmitter, the receiver, the controller and the estimator may be realized as separate units, or integrated in a single unit.

As is apparent from the foregoing description, the exemplary embodiments of the present invention allow multiple RUs to transmit control channel signals in the same way, and to transmit data channel signals independently, thereby contributing to an increase in the capacity of UEs and a reduction in the outage probability, and preventing overhead due to the frequent handover of UEs.

While the invention has been shown and described below with reference to certain exemplary embodiments thereof, it will be understood by those skilled in the art that various changes in form and details may be made therein without departing from the spirit and scope of the invention as defined by the appended claims and their equivalents.

What is claimed is:

[1. A method for transmitting a signal by a base station in a wireless communication system, the method comprising:

determining a plurality of user equipments (UEs) with a maximum scheduling metric based on channel quality information;

generating a common signal for the plurality of UEs;

generating a radio unit (RU) specific data signal for each of RUs;

multiplexing the common signal and the RU specific data signal; and transmitting, to each of the RUs, the multiplexed signal on a channel through a common public radio interface (CPRI) based on a wired medium;

wherein a cell is identified by the plurality of UEs based on the common signal, wherein the cell includes a plurality of sub-cells and each sub-cell is identified by at least one UE which is located in the each sub-cell, based on the RU specific data signal.]

[2. A base station in a wireless communication system, the base station comprising:

a transceiver configured to transmit and receive a signal; and a controller configured to:

determine a plurality of user equipments (UEs) with a maximum scheduling metric based on channel quality information, generate a common signal for the plurality of UEs, generate a radio unit (RU) specific data signal for each of RUs, multiplex the common signal and the RU specific data signal, and transmit, to each of RUs, the multiplexed signal through a common public radio interface (CPRI) based on a wired medium, wherein a cell is identified by (the plurality of UEs) based on the common signal, and wherein the cell includes a plurality of sub-cells and each sub-cell is identified by at least one UE which is located in the each sub-cell, based on the RU specific data signal.]

[3. A method for receiving and transmitting a signal by a radio unit (RU) in a wireless communication system, the method comprising:

receiving, from a base station, a signal through a common public radio interface (CPRI) based on a wired medium, wherein the received signal is generated by multiplexing a common signal for a plurality of user equipments (UEs) and a RU specific data signal for each RU; and transmitting the received signal at least one UE;

wherein a cell is identified by the plurality of UEs based on the common signal, and wherein the cell includes a plurality of sub-cells and each sub-cell identified by the at least one UE which is located in a sub-cell, based on the RU specific data signal.]

[4. A radio unit (RU) in a wireless communication system, the RU comprising:

a transceiver configured to receive and transmit a signal; and a controller configured to:

receive, from a base station, a signal through a common public radio interface (CPRI) based on a wired medium, wherein the received signal is generated by multiplexing a common signal for a plurality of user equipments (UEs) and a RU specific data signal for each RU, and transmit the received signal to at least one UE, wherein a cell is identified by the plurality of UEs based on the common signal, and wherein the cell includes a plurality of sub-cells and each sub-cell is identified by the at least one UE which is located in a sub-cell, based on the RU specific data signal.]

[5. A method for receiving a signal by a user equipment (UE) in a wireless communication system, the method comprising:

receiving a multiplexed signal from at least one radio unit (RU); and obtaining a common signal and a RU specific data signal from the multiplexed signal, wherein a cell is identified based on the common signal, wherein the cell includes a plurality of sub-cells and each sub-cell is identified by a UE which is located in the each sub-cell, based on the RU specific data signal, and wherein the UE has a maximum scheduling metric based on channel quality information.]

[6. A user equipment (UE) in a wireless communication system, the UE comprising:

a transceiver configured to receive and transmit a signal; and a controller configured to:

receive a multiplexed signal from at least one radio unit (RU), and obtain a common signal and a RU specific data signal from the multiplexed signal;

wherein a cell is identified based on the common signal, wherein the cell includes a plurality of sub-cells and each sub-cell is identified by a UE which is located in the each sub-cell, based on the RU specific data signal, and wherein the UE has a maximum scheduling metric based on channel quality information.]

[7. The method of claim 1, wherein the common signal includes at least one of a physical broadcast channel signal, a physical downlink control channel signal, a physical control format indicator channel signal, and a cell-specific reference signal.]

[8. The base station of claim 2, wherein the common signal includes at least one of a physical broadcast channel signal, a physical downlink control channel signal, a physical control format indicator channel signal, and a cell-specific reference signal.]

[9. The method of claim 3, wherein the common signal includes at least one of a physical broadcast channel signal, a physical downlink control channel signal, a physical control format indicator channel signal, and a cell-specific reference signal.]

[10. The RU of claim 4, wherein the common signal includes at least one of a physical broadcast channel signal, a physical downlink control channel signal, a physical control format indicator channel signal, and a cell-specific reference signal.]

[11. The method of claim 5, wherein the common signal includes at least one of a physical broadcast channel signal, a physical downlink control channel signal, a physical control format indicator channel signal, and a cell-specific reference signal.]

[12. The UE of claim 6, wherein the common signal includes at least one of a physical broadcast channel signal, a physical downlink control channel signal, a physical control format indicator channel signal, and a cell-specific reference signal.]

*13. A method performed by a Digital Unit (DU) of an evolved Node B (eNB) in a mobile communication system, the method comprising:*

*determining a plurality of user equipments (UEs) with the maximum scheduling metric for each unit resource;*

*multiplexing a control channel signal and a first data channel signal into a first multiplexed signal to transmit to a first Radio Unit (RU) among a plurality of RUs, wherein the first multiplexed signal includes a first dedicated data channel reference signal;*

*multiplexing the control channel signal and a second data channel signal into a second multiplexed signal to transmit to a second RU among the plurality of RUs, wherein the second multiplexed signal includes a second dedicated data channel reference signal;*

*transmitting the first multiplexed signal to the first RU through a common public radio interface (CPRI) based on a wired medium; and*

*transmitting the second multiplexed signal to the second RU through the CPRI based on the wired medium,*

*wherein the control channel signal is same for each of the RUs, and the first data channel signal and the second data channel signal are different for the first and second RUs,*

*wherein the eNB is identified by the plurality of UEs based on the control channel signal,*

*wherein the eNB includes the plurality of RUs, including the first RU and the second RU,*

*wherein the first RU is identified by at least one UE located in a coverage area of the first RU based on the first dedicated data channel reference signal,*

*wherein the first data channel signal is received by the at least one UE based on channel estimates of the first dedicated data channel reference signal,*

*wherein the second RU is identified by at least one UE located in a coverage area of the second RU based on the second dedicated data channel reference signal, and*

*wherein the second data channel signal is received by the at least one UE based on channel estimates of the second dedicated data channel reference signal.*

*14. The method according to claim 13, further comprising:*

*generating same control channel signal and the first and second data channel signals for the first and the second RUs.*

*15. The method according to claim 13, further comprising:*

*performing a scheduling operation; and*

*generating the first and second data channel signals and the control channel signal based on the scheduling operation.*

*16. The method according to claim 15, wherein the scheduling operation calculates a scheduling metric for each unit resource based on channel quality information about channels between the first and second RUs and a plurality of associated UEs, received from the plurality of associated UEs.*

*17. The method according to claim 16, wherein the scheduling operation determines the UE having the maximum scheduling metric for each unit resource.*

*18. The method of claim 13, wherein the first and second multiplexed signals further comprise:*

*control channel reference signals.*

*19. The method of claim 13, wherein the control channel signal includes at least one of a physical broadcast channel signal, a physical downlink control channel signal or a physical control format indicator channel signal.*

*20. An evolved Node B (eNB) for use in a mobile communication system, the eNB comprising:*

*a digital unit (DU) including a multiplexer,*

*wherein the digital unit including the multiplexer is configured to:*

*determine the plurality of user equipments (UEs) with the maximum scheduling metric for each unit resource;*

*multiplex a control channel signal and a first data channel signal into a first multiplexed signal to transmit to a first Radio Unit (RU) among a plurality of RUs, wherein the first multiplexed signal includes a first dedicated data channel reference signal,*

*multiplex the control channel signal and a second data channel signal into a second multiplexed signal to transmit to a second RU among the plurality of RUs, wherein the second multiplexed signal includes a second dedicated data channel reference signal,*

*transmit the first multiplexed signal to the first RU through a common public radio interface (CPRI) based on a wired medium, and*

*transmit the second multiplexed signal to the second RU through the CPRI based on the wired medium, and*

*wherein the control channel signal is same for each of the first and second RUs, and the first data channel signal and the second data channel signal are different for the first and second RUs,*

*wherein the eNB is identified by the plurality of UEs based on the control channel signal,*

*wherein the eNB includes the plurality of RUs, including the first RU and the second RU,*

*wherein the first RU is identified by at least one UE located in a coverage area of the first RU based on the first dedicated data channel reference signal,*

*wherein the first data channel signal is received by the at least one UE based on channel estimates of the first dedicated data channel reference signal,*

*wherein the second RU is identified by at least one UE located in a coverage area of the second RU based on the second dedicated data channel reference signal, and*

*wherein the second data channel signal is received by the at least one UE based on channel estimates of the second dedicated data channel reference signal.*

*21. The eNB according to claim 20, wherein the digital unit is further configured to generate same control channel signals and the first and second data channel signals for the first and second RUs.*

*22. The eNB according to claim 20, wherein the digital unit is further configured to:*

*perform a scheduling operation, and*

*generate the first and second data channel signals and the control channel signal based on based on the scheduling operation.*

*23. The eNB according to claim 22, wherein the scheduling operation calculates a scheduling metric for each unit resource based on channel quality information about channels between the first and second RUs and a plurality of associated UEs, received from the plurality of associated UEs.*

*24. The eNB according to claim 23, wherein the scheduling operation determines the UE having the maximum scheduling metric for each unit resource.*

*25. The eNB of claim 20, wherein the digital unit is further configured to:*

*multiplex the control channel signal and the first and second data channel signals with control channel reference signals and data channel reference signals, and*

*transmit the first and second multiplexed signals to the plurality of RUs.*

*26. The eNB according to claim 20, wherein the control channel signal includes at least one of a physical broadcast channel signal, a physical downlink control channel signal or a physical control format indicator channel signal.*

* * * * *